Jan. 29, 1957 E. M. KELLY ET AL 2,779,730
SEWAGE TREATMENT
Filed April 27, 1953 4 Sheets-Sheet 1
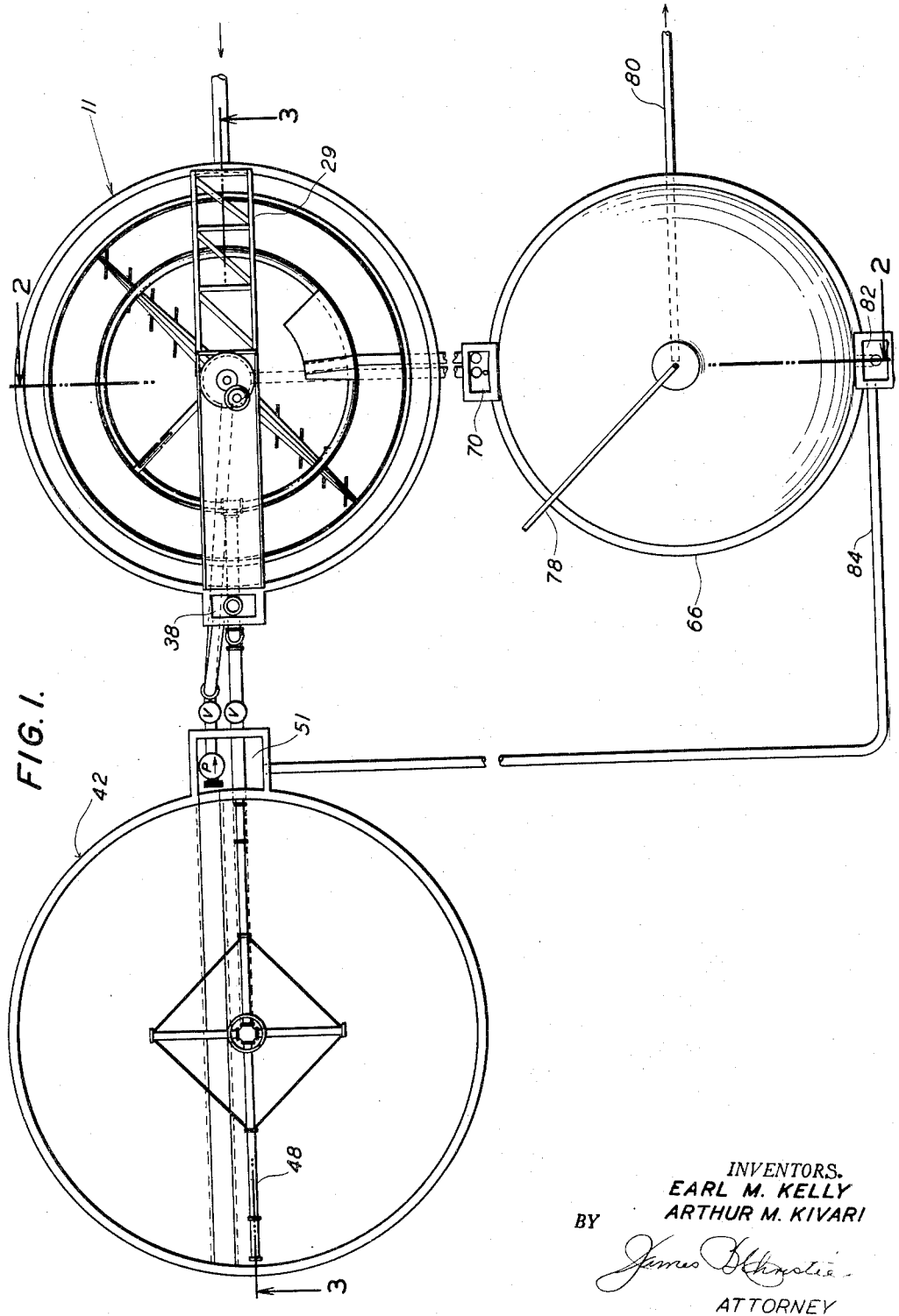
FIG. I.
INVENTORS.
EARL M. KELLY
ARTHUR M. KIVARI
BY
*James H. Christie*
ATTORNEY

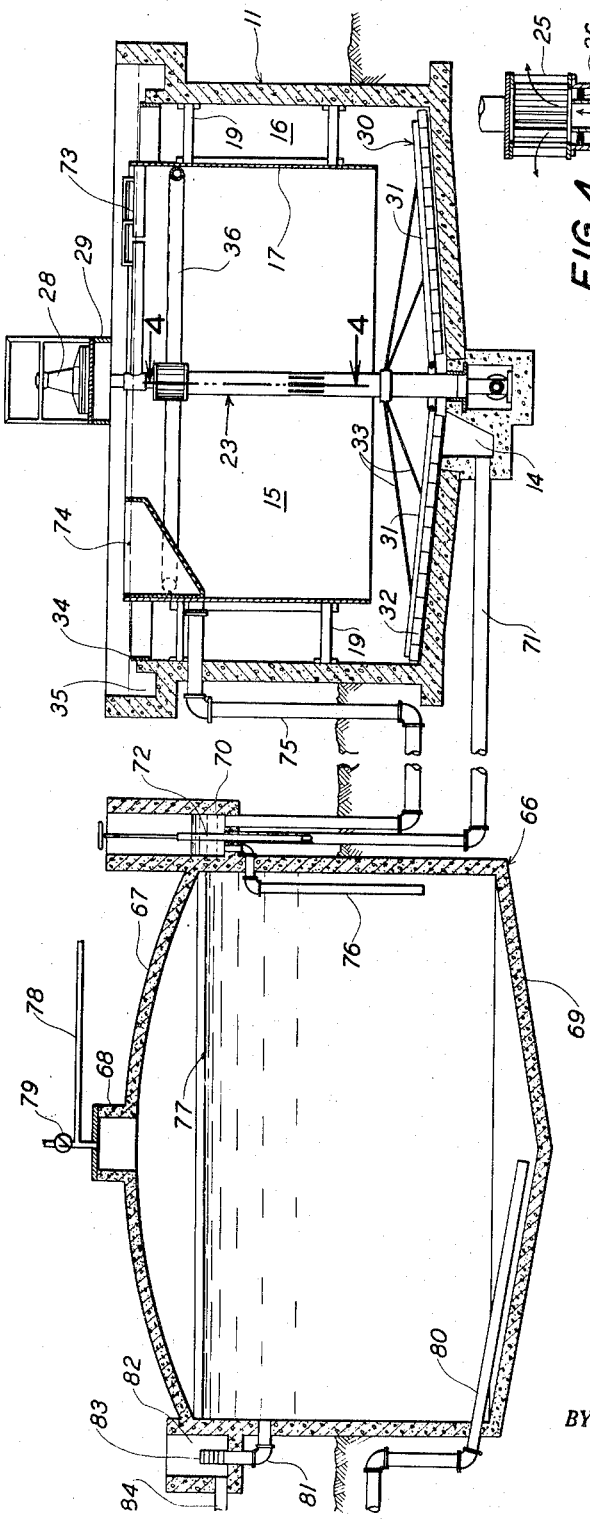
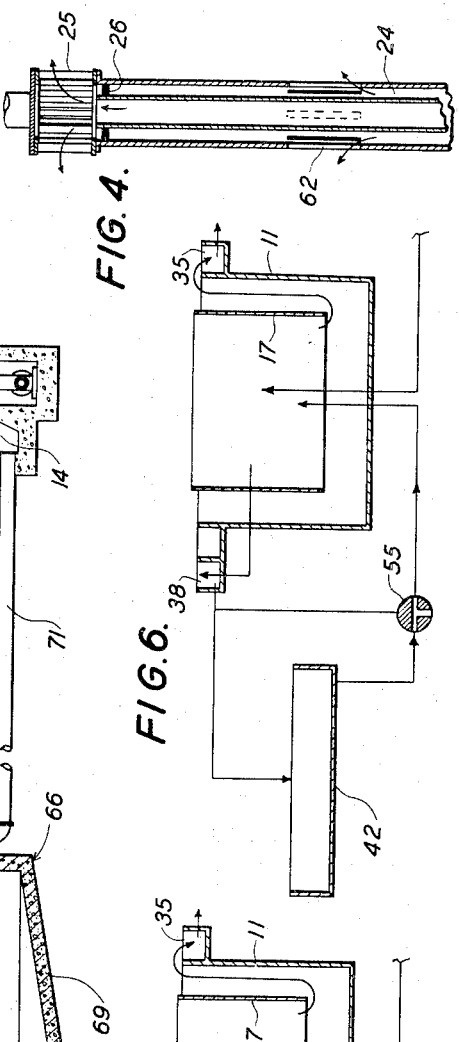
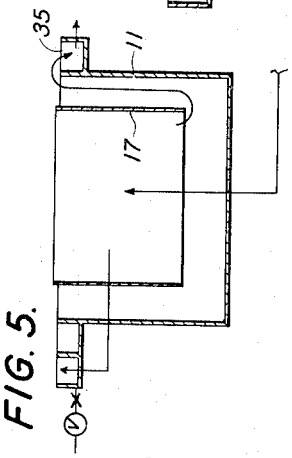

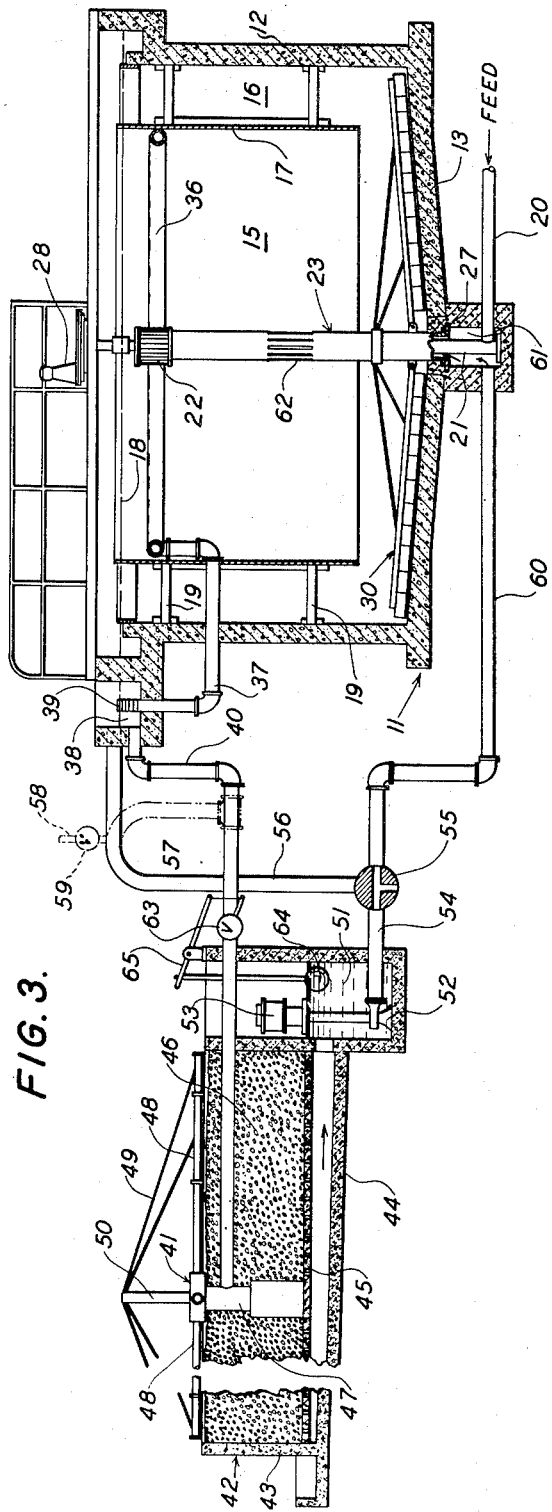

Jan. 29, 1957　　　E. M. KELLY ET AL　　　2,779,730
SEWAGE TREATMENT

Filed April 27, 1953　　　　　　　　　　4 Sheets-Sheet 4

INVENTORS.
EARL M. KELLY
ARTHUR M. KIVARI
BY

ATTORNEY

United States Patent Office 2,779,730
Patented Jan. 29, 1957

2,779,730

SEWAGE TREATMENT

Earl M. Kelly, Hillsborough, and Arthur M. Kivari, Los Angeles, Calif., assignors to Process Engineers Incorporated, San Francisco, Calif., a corporation of California Application April 27, 1953, Serial No. 351,114

3 Claims. (Cl. 210—2)

This invention relates to sewage treatment and provides an improved treatment system which is particularly adapted to small installations such as those required for isolated public institutions, industrial plants and small communities.

In large cities, high sewage volume and diversified sources of sewage tend to "average out" the quality of sewage over relatively long periods and also tend to reduce fluctuations in sewage flow. These inherent approaches to uniformity in quality and quantity of sewage tend to simplify plant design and operation. However, sewage produced by isolated institutions, industrial plants and small communities often fluctuates widely and rapidly both in quantity and quality. In consequence, the treatment of sewage from such sources imposes serious problems and often requires much higher capital investment and much greater operation and maintenance costs per unit of throughput than is the case in the larger installations adapted for cities.

We have developed apparatus for sewage treatment which overcomes in large measure the difficulties heretofore encountered in the design and operation of small installations, and our invention brings adequate sewage treatment within the economic reach of many municipalities, factories, and public institutions for the first time. The sewage plant of our invention is inexpensive from the standpoint of invested capital, requires little supervision and direct labor, has low power requirements, and is inexpensive to maintain. Moreover, it provides a wide range of circulation and treatment positions which are obtainable with a bare minimum of controls and adjustments and is capable of meeting wide and rapid variations in the nature and quantity of sewage undergoing treatment. In its preferred form it provides for both primary and secondary settling, aerobic treatment of liquid effluent from the primary settlement zone in a trickling filter, and anaerobic treatment of sewage sludge from both settling zones in a sludge digester. All of this treatment may be accomplished by means of a single pump, which may also be used for recirculating trickling filter effluent and for handling supernatant liquor from the sludge digester.

In some instances the sludge digester may be eliminated and in one aspect, the apparatus of our invention comprises a settling tank for holding a pool of sewage liquid, a baffle in the tank extending above and below the pool surface and dividing the tank into primary and secondary settling zones connected with each other underneath the baffle, means for introducing sewage to be treated into the primary settling zone, a control sump, a first conduit connecting the upper portion of the primary settling zone with the control sump and preferably permitting gravity flow of primary effluent into the sump, a biological filter, a second conduit connecting the sump with the filter inlet and preferably positioned to permit gravity flow from the sump to the filter, a pump with its inlet connected with the filter outlet and preferably receiving filter effluent by gravity flow, a third conduit connecting the pump outlet to the primary settling zone, overflow means (such as a weir) for effluent from the secondary settling zone, means for removing settled solids from the bottom of both settling zones, this flow of settled solids also being preferably caused by gravity alone, and means for regulating the rate of flow in the first conduit from the primary settling zone into the control sump.

Apparatus constructed as described above requires but a single pump, to force filter effluent back into the primary settling zone. If desired, this apparatus can be supplemented by a sludge digester so situated that the flow of sludge into it from both settling zones is caused by gravity, with gravity flow of supernatant liquid from the sludge digester back to the pump inlet. At this point, this effluent merges with the filter effluent to be returned to the primary settling zone or circulated back over the biological filter or both.

The flow control means in the first conduit between the primary settling zone and the control sump may take various forms (such, for example, as a valve) but preferably it comprises a stack of superposed rings at the conduit outlet so that the effective elevation of the outlet may be adjusted to increase or decrease or entirely cut off the flow from the primary settling zone to the biological filter.

In its preferred form, the apparatus of our invention is provided with a by-pass conduit connected to the pump outlet for returning filter effluent, directly, or through the control sump. Thus, the effluent from the biological filter, or part of it, can be returned to the filter itself in cases where additional aerobic treatment is desirable.

In one preferred form of our apparatus, the effluent from the biological filter is fed to a second or pump sump which in turn feeds the pump. A valve disposed in the conduit connecting the control sump to the inlet of the biological filter is opened and closed by means of a float disposed in the pump sump and connected by mechanical or other linkage to the valve. As the level in this pump sump rises to an excessive degree, the valve is automatically closed and reduces the flow to the biological filter, but this is accomplished without fear of overflowing the control sump, because this sump is so located that as liquid backs up into it, the flow into it from the primary settling zone is automatically cut off by the hydraulic head in the sump itself.

These and other aspects of our invention will be understood more thoroughly in the light of the following description which is illustrated by the accompanying drawings, in which:

Fig. 1 is a plan view of one preferred form of our complete sewage treatment apparatus;

Fig. 2 is an elevation, partly in section, taken along the line 2—2 of Fig. 1;

Fig. 3 is an elevation, partly in section, taken along the line 3—3 of Fig. 1;

Fig. 4 is an enlarged fragmentary elevation, partly in section, taken along the line 4—4 of Fig. 1;

Figs. 5 to 8 are flow sheets respectively illustrating some of the flow patterns available with the apparatus of Figs. 1 to 4;

Figure 9:
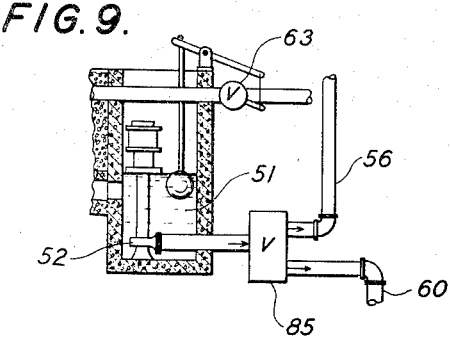
Fig. 9 is a fragmentary elevation through the pump sump of the apparatus of Figs. 1 to 4 inclusive, illustrating an alternate valve arrangement on the pump outlet.

The apparatus of Figs. 1 to 4 inclusive comprises a round tank 11 having a vertical outside wall 12 and an inverted frusto-conical bottom 13 which slopes gently to a sludge pit 14 near its center (see Fig. 2). The settling tank is divided into an inner primary settling zone 15 and an outer annular secondary settling zone 16 by a vertical cylindrical baffle 17 disposed in the tank with its lower edge clear of the tank bottom and with its upper edge projecting above the surface 18 of a pool of liquid retained in the tank. Thus the two settling zones communicate with each other solely underneath the baffle. The baffle is supported in the tank by radial brackets 19 which extend from the outside wall.

The feed to the system is raw sewage from which has been removed grid, fruit pits and other coarse solids which tend to plug pipes. As shown in Figs. 3 and 4, this feed is introduced through a pipe line 20 running underneath the settling tank and connecting to the bottom of a vertical riser pipe 21 concentric with the tank axis. This riser pipe is stationary and, as shown in Fig. 4, it terminates in a submerged distributor 22 which is disposed concentrically with the tank axis and forms part of a vertical rotating column 23 which is likewise concentric with the tank axis and encloses the stationary riser pipe, there being an open annular space 24 between the two. The distributor is provided with vertical vanes 25 which impart a swirling motion to the sewage as it enters the pool near the upper portion of the primary settling zone. Since the riser pipe is stationary and the distributor rotates with the column, the two are connected by a packing gland 26 disposed across the annular space where the riser enters the distributor.

The rotating column rests on an annular bearing 27 in the tank bottom (see Fig. 3) and extends upwardly above the liquid level in the tank. A conventional drive mechanism 28 is coupled to the top of the rotating column. This drive mechanism rests on a bridge 29 that extends diametrically across the top of the tank.

A conventional rake mechanism 30 is attached to the rotating column and comprises rake arms 31 which extend outwardly from the column almost to the outside tank wall just above the tank bottom. These arms are provided with rakes 32 and are supported by tie rods or trusses 33 fastened to the column above the point at which the arms are attached. As the rotating column turns, sludge settling in the bottom underlying both the primary and secondary settling zones pursues a spiral path across the bottom into the sludge pit.

Liquid introduced into the primary settling zone flows downwardly underneath the baffle and upwardly in the secondary settling zone and overflows the level upper edge or weir 34 of the tank wall into a peripheral launder or gutter 35. This clarified and purified liquid constitutes the final effluent of the system. The peripheral weir has a large capacity and will handle large flows without appreciably increasing the liquid level in the settling tank.

A primary effluent launder 36 in the form of a perforated ring of pipe is disposed in a horizontal position just inside the baffle and submerged in the pool, its level being substantially the same as that of the distributor through which the primary feed enters. As shown in Fig. 3, this primary effluent launder is connected by an inverted syphon 37 which passes through the baffle and the tank wall and discharges into the bottom of a control sump 38 formed integrally with the tank wall and its overflow launder. The bottom of the sump is level with the bottom of the overflow launder but its walls extend substantially higher than the top of the weir which establishes the liquid level within the tank proper.

As will be seen from Fig. 3, there will be flow from the primary settling zone into the control sump so long as the discharge end of the inverted syphon is lower than the liquid level in the tank. Means comprising a series of superposed nested metal rings 39 are provided in the control sump to raise or lower the effective height of its discharge end. The rings may be stacked one atop the other on the discharge end of the syphon to vary the effective head between the primary settling zone and the control sump and thus adjust the rate of flow. If the rings are stacked high enough, i. e. at least up to the level of the pool in the settling tank, the flow may be cut off completely. Other control means such as a valve may be employed in place of the stacked rings, but the latter are convenient and relatively fool-proof and once set are not susceptible to clogging with consequent variation in flow rate.

A pipe connection 40 leads from the bottom of the control sump to a distributor 41 of a conventional trickling biological filter 42. The filter is a circular concrete tank having a vertical side wall 43 and a sloping bottom 44. A perforated false bottom or underdrain structure 45 overlies the real bottom and supports a porous bed of rocks 46 upon which zoogloeal slime forms. This slime contains aerobic micro organisms of decay. The organic wastes contained in the sewage liquid flowing to the filter furnish a rich food supply for these micro organisms.

The distributor is a conventional turbo type which spreads the filter influent more or less evenly over the top of the bed. It comprises a center column 47 through which the influent flows to a plurality of horizontal radially disposed perforated tubes 48 which are supported by tie rods 49 from a central post 50 rising above the distributor. The perforations are drilled horizontally on the same side of each tube and the reaction of the liquid escaping through the perforations turns the distributor around the vertical axis. The liquid trickles down through the filter in contact with the micro organisms and in the presence of air and the life processes of the organisms lower the biological oxygen demand of the liquid by consuming dissolved and suspended organic matter in the liquid.

The liquid percolating through the bed flows along the sloping bottom of the filter to a pump sump 51 disposed at the side of the filter with the bottom of the sump considerably below the filter bottom and with its walls rising well above the false bottom. A centrifugal pump 52 with a long vertical drive shaft rests on the bottom of the sump and is driven by a direct connected motor 53 resting on top of the pump's shaft housing. The pump, under normal operating conditions, is submerged. A pump discharge pipe 54 runs out through the side of the pump sump to a three-way valve 55 disposed at a T. One branch 56 of the T runs from the three-way valve back into the upper portion of the control sump, or alternatively as shown by the dotted lines in Fig. 3, makes a U bend 57 having an air vent 58 equipped with a valve 59 at the top of the U, the branch in this alternate being connected directly to the line flowing from the control sump to the filter distributor. The other branch line 60 of the T is connected to a chamber 61 located just below bottom center of the settling tank. From this chamber liquid is forced upwardly through the annular bearing of the rotating column into the annular space between the column and the feed riser and thence through vertical slots 62 located about half way up the column so that the discharge is radial into a mid portion of the primary settling zone.

The three-way valve may be adjusted to direct the pump outflow entirely into the primary settling zone or entirely back into the filter distributor or in both directions at the same time.

The pipe line from the control sump to the filter distributor is provided with a butterfly valve 63 which is controlled by a float 64 that rises and falls with the level of liquid in the pump sump. The float is connected to the valve by a mechanical linkage 65 so that when the liquid rises in the pump sump to an excessive level the float and linkage tend to close the butterfly valve to restrict flow into the filter. In this manner liquid is prevented from entering the filter in excess of the pump's capacity to remove it. However, even if the butterfly valve is completely closed, there is no danger of overflowing the control sump, because its walls rise above the liquid level in the settling tank. Hence, as soon as the liquid head between the control sump and the settlement tank through the inverted syphon is equalized, flow from the primary settling zone automatically stops.

Referring now to Fig. 2, it will be seen that the system has a sludge digester of conventional type comprising a round upright tank 66 sealed at the top by a domed cover 67 (having a gas receiver 68) and with an inverted conical bottom 69. The bottom of the sludge digester is located slightly below the bottom of the sludge digester and the top of the dome is about at the level of the top of the settling tank. Near the upper edge of the sludge digester on the side toward the settling tank is a sludge sump 70, the bottom of which is below the level of liquid in the settling tank. A pipe 71 leads from the sludge pit of the settling tank and enters the bottom of the sludge sump, the flow through this line from the sludge pit to the sludge sump being by gravity on account of the relationship of liquid levels and being controlled by a telescopic valve 72 of conventional design located in the sludge sump.

In the operation of the settling tank, scum accumulates on the top of the pool within the primary settling zone. This scum is moved by a rotating horizontal skimmer arm 73 fastened to the rotating column of the settling tank around and into a scum trough 74 which is fastened to the inside wall of the baffle, with the bottom of the trough sloping toward the baffle. A pipe 75 extends from the bottom of the scum trough through the baffle and the side wall of the settling tank and is connected to the bottom of the sludge sump. Scum scraped into the trough thus flows along with settled sludge into the sludge sump and thence by gravity through a downcomer pipe 76 which extends through the side of the sludge digester itno a lower portion of the digester.

A pool of sludge undergoing digestion under anaerobic conditions fills the digester tank up to a level 77. Gas, principally methane, generated by the digestive reactions fills the dome above the pool, from which it may be bled when the dome is under pressure and wasted or burned to generate heat. The gas thus escapes through a conventional gas line 78 which is equipped with a conventional vacuum relief valve 79 which will open if subatmospheric pressure is developed in the tank and thus prevent the collapse of the dome.

The reaction on the sludge digester is the typical anaerobic decomposition. As the decomposition progresses sludge settles to the bottom of the digester and scum accumulates at the top, with a zone of supernatant liquor in between. The settled sludge is withdrawn from the bottom of the digester through an outlet pipe 80 and is sent to waste, while the supernatant liquor is tapped off by a pipe 81 through the side of the digester into the bottom of a supernatant liquor sump 82 disposed at the side of the digester tank opposite the sludge sump and near the top of the tank. Flow of supernatant liquor into the sump may be adjusted by adjusting the height of a stack of metal rings 83 which are stacked above the pipe inlet to the sump. From the supernatant liquor sump the liquor flows by gravity through a pipe 84 back to the pump sump, where it merges with the filter effluent and may be sent with the filter effluent back to the primary sedimentation zone or back to the filter. In this fashion this malodorous product is returned to the system with the minimum of process difficulties.

Depending on the character of the sewage being treated, it may be desirable to circulate liquid from the primary zone through the filter at widely varying rates. We have found that in this type of sewage treatment the biological filter works most efficiently when filtering liquid from the primary zone. There is a greater concentration of nitrogeneous material in this zone, and a given rate of circulation will carry to the filter a greater amount of impurities. For that reason, this system is designed to return filter effluent to the primary settling zone rather than to the secondary settling zone. A maximum load thus is imposed on the filter assuring its micro organisms a sufficient supply of food. In case the upper part of the filter becomes overloaded, the rate of recirculation of filter effluent through the bypass may be increased.

Optimum treatment calls for various flow and recirculation arrangements depending on the nature and the strength of the sewage to be treated. This is particularly true of circulation through the filter. For certain wastes the use of a trickling filter may not be desired at all, a simple sedimentation process being adequate. For other applications a very high recirculation rate from the primary settling zone through the filter and back to the primary settling zone again may be necessary. On the other hand, for the treatment of a sudden load of very strong sewage, it may be desirable to recirculate the filter effluent solely through the filter for a period of time, or to recirculate a very large amount of the filter effluent with some new liquid from the primary zone through the filter several times before returning it to the primary settling zone in order that optimum BOD removal may be obtained in the region where BOD is the highest, that is, the primary settling zone. This also provides benefits by further BOD removal in the primary zone itself, since the filter effluent acquires a considerable amount of oxygen while trickling over the filter bed. This dissolved oxygen is carried directly to the primary zone. All these combinations and a wide range of recirculation ratios are obtainable with the system of the present invention, requiring only a moderate adjustment of controls.

The various flow patterns available with this apparatus in its sedimentation and filter sections are illustrated by Figs. 5 to 8 inclusive. The entire control of recirculation ratio, that is, the ratio of the volume of liquid passing through the filter and returning to the primary zone to the volume of raw sewage inflow in unit time, is determined by adjusting the rate of flow from the primary zone into the control sump. The position of the three-way valve in the line between the sump pump and the primary settling zone determines the rate of recirculation of filter effluent directly back to the filter after steady flow is reached.

Fig. 5 illustrates the use of the system without the filter. For this it is only necessary to cut off flow to the control sump. Several types of controls are available for this purpose, including telescopic valves, needle valves and gate valves. The simplest control, however, is the plurality of metal rings stacked vertically over the inlet from the primary settling zone to the control sump. When the level of this stack is as high as the level of the pool in the settling tank, there will be no flow to the control sump, and therefore none to the filter. Then the settling tank acts merely as a sedimentation device having two zones, and the liquid proceeds from the upper part of the primary zone downward under the baffle, upward to the surface of the pool, and overflows into the effluent gutter at a rate substantially equal to the raw sewage inflow. Settled solids are drained off from the bottom of the tank.

Fig. 6 illustrates the case of straight recirculation of primary liquid through the filter and back to the primary zone. Control of the rate of recirculation is solely a function of the rate of inflow into the control sump, since the conduit leading from the control sump is of sufficient size to keep that sump drained while that conduit is open. Rate of flow in a completely filled pipe is to a large part a function of pressure, and it will be seen that the rate of flow into the control sump may be varied by raising or lowering the level of the rings. This changes the discharge pressure of the stream into the control sump by varying the hydraulic head. That adjustment is made by adding or removing some of the rings. When the ring level is very low the differential of pressure in the pipe between tank inlet and sump outlet causes a high rate of flow. When the rings are raised to a height nearly equal to that of the liquid level in the tank, inflow is greatly reduced and, as indicated in the above paragraph, may be entirely shut off.

Liquid which flows into the control sump is conveyed directly to the filter and from the filter to a pump which impels the liquid back into the primary zone. In this case the three-way valve is set so that no liquid is permitted to flow into the by-pass, as shown in Fig. 6. Liquid from the primary zone flows under the baffle to the secondary zone where it flows into the gutter at a rate equal to sewage inflow. A wide range of rates of recirculation is available, depending upon the rate of flow to the control sump.

The pump is a constant speed device which will remove all liquid flowing to it up to its capacity. The sole concern in this design is that the rate of inflow into the control sump must not exceed the capacity of the pump. If it does, the filter will be overloaded and finally may overflow.

Fig. 7 illustrates an arrangement which may be utilized to clear out the filter or to give special treatment to a sudden load of especially strong sewage, i. e. one with an unusually high BOD. It will be observed that the three-way valve is positioned so that there is no return flow to the primary zone, all the filter effluent being returned to the filter via the by-pass. In this manner filter effluent may be recycled as long as desired to provide any desired BOD removal in the batch present in the closed circuit through the filter.

Fig. 8 shows the control arrangement whereby both direct recirculation of primary liquid through the filter and additional recirculation of filter effluent directly back to the filter may occur simultaneously. This results in a very high BOD removal and the best use of the filter. The three-way valve is positioned so as to divide the flow from the pump, sending part to the primary zone and part through the by-pass for return directly to the filter.

In order that the three-way valve may operate as a distributor (i. e. to properly proportion the two returns and hold them in a constant ratio) it should be opposed by approximately the same hydraulic head on each of its outlet branches. For that reason, the by-pass or upper branch 56 is caused to rise at least to the level of the liquid in the settling tank discharging into the control sump. As an alternate arrangement it may arise in the form of an inverted loop (as shown in phantom line in Fig. 3) discharging directly into the pipe from control sump to the filter distributor. Should this alternate arrangement be used, it may be desirable to install the vent to avoid siphoning through this branch. There is then no tendency for the primary liquid to flow back through its filter influent line into the by-pass and thence to the filter. This bend saves the installation of backflow check valves to prevent the settling tank from emptying into the filter through the influent column.

Concerning rates of recirculation, the rate of return to the primary settling zone from the pump must not be appreciably less than the inflow to the control sump lest the filter system become overloaded. Should this occur, however, it will usually be found that too large a quantity of liquid is flowing through the by-pass into the control sump. Such excessive flow would be relieved partially by the filling of the control sump to a higher level, slowing flow from the primary zone. Should the flow through the by-pass and flow from the primary zone together exceed filter capacity, the float and butterfly valve in the filter influent would lessen the rate and the excess would tend to backflow into the primary zone rather than to overflow the sump.

The accompanying table indicates suggested dimensions for the system based for institutions or communities of various populations and illustrates the remarkably small units necessary for a high degree of purification. These systems remove as much as 90% of the BOD with ease. In addition to the purified liquid effluent, there is only one other product to dispose of, the digested sludge, since scum and settled solids are both conveyed to the digester, and the supernatant liquor from the digester is disposed of in the filter.

| Population | Sewage Inflow (Millions of gallons per day) | Primary Settling Tank Compartment | | Secondary Compartment | | Biological Filter | | | Digester | | Recirculation Pump (gallons per minute) |
|---|---|---|---|---|---|---|---|---|---|---|---|
| | | Diameter | Pool Surface To Baffle Bottom | Diameter | Pool Surface To Base Edge | Diameter | Rock Depth (Feet) | Maximum Flow (Gallons per minute) | Diameter | Side Wall Height | |
| 500 | 0.05 | 12'.0" | 10'.0" | 16'.0" | 12'.0" | 21'.0" | 4'.0" | 175 | 16'.0" | 12'.6" | 175 |
| 1,000 | 0.10 | 18'.0" | 10'.0" | 23'.0" | 12'.0" | 30'.0" | 4'.0" | 350 | 23'.0" | 12'.6" | 350 |
| 1,500 | 0.15 | 22'.0" | 10'.0" | 28'.0" | 12'.0" | 36'.0" | 4'.0" | 525 | 28'.0" | 12'.6" | 525 |
| 2,000 | 0.20 | 25'.0" | 10'.0" | 32'.0" | 12'.0" | 41'.0" | 4'.0" | 700 | 32'.0" | 12'.6" | 700 |

Instead of the three-way valve on the pump outlet individual valves (not shown) on each branch may be used, or (as shown in Fig. 9) a conventional distributor valve 85 may be employed. This valve discharges into either or both of the pump outlet branches and the proportions of flow in each conduit are determined by the valve setting.

Figure 10:
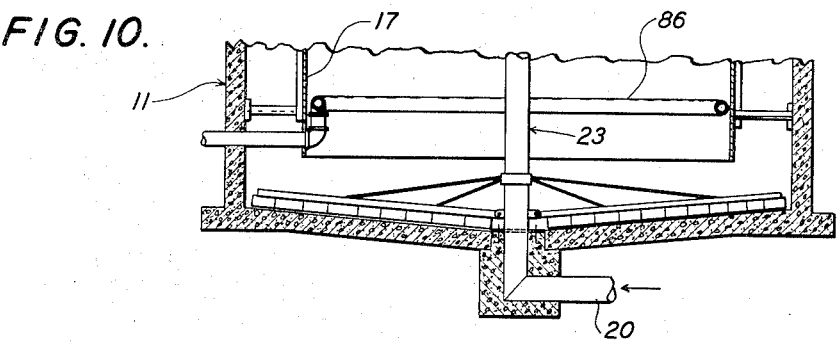
Fig. 10 is a fragmentary elevation through the settling tank of Figs. 1 to 4 illustrating an alternate means of returning effluent from the biological filter to the primary settling zone.

Fig. 10 illustrates an alternate type of equipment for return of liquids to the primary settling zone. It comprises a launder 86 in the form of a horizontal perforated pipe ring disposed just inside the baffle above its lower edge and fed from the pump and the line 29.

Distinct savings in equipment costs result from the use of the unique return means described above and illustrated in Fig. 4, ring-shaped conduits as shown in Fig. 10 being very expensive. A ring-shaped conduit would suffer from the additional disability that a short circuit flow directly up the baffle to the effluent launder would be possible. Efficient design of this type of settling tank calls for a relatively long and leisurely path. The shortest path between the slots in the column and the effluent launder is the hypotenuse of a right triangle. This shortest path is much longer than the path directly up the baffle. In practice, it has been observed that the arrangement shown in Fig. 2 acts to provide a hydraulic "baffle" which retards both upward and downward flow, giving all particles a chance to settle out. A typical settling rate of particles found in common sewage is approximately 32 feet per hour, while vertical flow in average installation of this type is of the order of 8 feet per hour. Thus this counterflow does not materially impede the settling of the particles.

The entire system should have liquid levels arranged relatively as shown. The level in the settling tank, as determined by the overflow weir, should be the highest liquid point in the system. The control sump must extend upwardly at least to that level as well as substantially beneath it. The filter may be at any elevation beneath the tank, but should not be so low that the pump (which is still lower) must do unnecessary work to force filter effluent back into the primary settling zone. The sludge sump for introducing settled solids and scum to the digester also should be lower than the surface in the settling tank and the liquid level in the sludge sump should be at least as high as that in the digester and as high as the discharge end of the pipe leading from the digester to the supernatant liquor sump. When the devices are properly positioned from the standpoint of elevation, the power and pumping requirements are reduced to the absolute minimum of one pump for circulation of liquid and one motor for turning the rakes in the settling tank. All other flow and product removal is by means of gravity. Hence, initial investment and maintenance expenses are greatly diminished, and the number of controls is reduced to those understandable and usable by semi-skilled operators.

The complexity of controls is reduced to a point where semiskilled operators may adjust this essentially automatic apparatus. There is little point in installing a complex system under circumstances where budgets are so low that a highly skilled man cannot be hired to supervise the plant. Nor is a flexible system of any value if, to attain its optimum performance, supervision must be exercised which is beyond the abilities of men available to operate the works. This apparatus has reduced controls to the bare minimum of a ring stack and one adjustable valve.

Further economies result by combining both primary and secondary settling operations in a single tank, since two individual tanks will cost more to build than one tank of the same total liquid capacity.

The apparatus of the invention also provides a system sufficiently flexible to meet the future needs of small communities, while requiring a minimum of adjustable components which are simply and expeditiously set, still yielding optimum sewage treatment.

We claim:

1. In apparatus for sewage treatment, the combination which comprises a settling tank for holding a pool of sewage liquid up to a level, a baffle in the tank dividing it into primary and secondary zones and extending above and below the level in the tank, the primary and secondary zones being in communication with each other underneath the baffle, a large overflow weir on the secondary settling zone for discharging liquid effluent from the secondary zone in such large volume that the level in both settling zones rises but slightly with increased flow, means for introducing a stream of sewage into the primary settling zone, a control sump having its top above the level of the pool in the settling tank and its bottom below said level, a conduit connected from an upper portion of the primary settling zone to the control sump and disposed below the level of the pool in the settling tank for flowing liquid by gravity from the primary settling zone into the control sump, a biological filter having an inlet at its top and an outlet at its bottom, the top being located below the control sump, a conduit connecting the control sump to the inlet of the biological filter and permitting gravity flow of liquid from the control sump to the filter, a pump sump having a bottom located below the filter outlet, a conduit connecting the filter outlet to the pump sump to permit gravity flow of liquid from the filter outlet to the pump sump, a pump having its inlet connected to the pump sump and having an outlet conduit with two branches, one branch being connected to the primary settling zone and the other branch being connected to the filter inlet, valving means for controlling the flow in the two branches, and means for regulating the flow of liquid from the primary settling zone to the control sump.

2. Apparatus according to claim 1 provided with a float in the pump sump, a valve in the conduit leading from the control sump to the filter inlet, and a linkage for automatically closing the valve when the liquid in the pump sump reaches a given level and for automatically opening the valve when the liquid in the pump sump drops below said level.

3. Apparatus according to claim 1 having an anaerobic sludge digester adapted to contain a pool of sludge undergoing digestion and having an outflow means for digester effluent located below the level of the pool in the settling tank but above the bottom of the settling tank and also above the bottom of the pump sump, a conduit connecting the bottom of the settling tank to the sludge digester below the level of the pool of sludge in the sludge digester and permitting gravity flow of sludge into the digester, a conduit connected to a lower portion of the digester for removing sludge therefrom, and a conduit connecting the outflow means of the sludge digester to the pump sump and permitting gravity flow of digester effluent to the pump sump.

References Cited in the file of this patent

UNITED STATES PATENTS

| | | |
|---|---|---|
| 1,035,813 | Rice | Aug. 13, 1912 |
| 2,348,126 | Green | May 2, 1944 |
| 2,355,760 | Trebler | Aug. 15, 1944 |
| 2,568,452 | Kelly et al. | Sept. 18, 1951 |
| 2,714,090 | Thompson et al. | July 26, 1955 |